United States Patent [19]
Richter et al.

[11] 3,986,890
[45] Oct. 19, 1976

[54] METHOD OF PRODUCING STARCH HYDROLYSIS PRODUCTS FOR USE AS FOOD ADDITIVES

[75] Inventors: Manfred Richter; Friedrich Schierbaum, both of Potsdam; Siegfried Augustat, Potsdam-Rehbrucke; Klaus-Dieter Knoch, Berlin, all of Germany

[73] Assignee: Akademie der Wissenschaften der DDR, Berlin-Adlershof, Germany

[22] Filed: Feb. 4, 1976

[21] Appl. No.: 655,313

Related U.S. Application Data

[60] Continuation-in-part of Ser. No. 551,183, Feb. 19, 1975, which is a division of Ser. No. 391,711, Aug. 27, 1973.

[30] Foreign Application Priority Data

Feb. 21, 1972 Germany............................ 1216110

[52] U.S. Cl..................................... 127/38; 127/29; 127/71; 426/578; 426/579; 426/589
[51] Int. Cl.²........................................... C13K 1/06
[58] Field of Search ................... 127/70, 71, 29, 38

[56] References Cited

UNITED STATES PATENTS 3,692,580  9/1972  Hirao .............................. 127/38 X

*Primary Examiner*—Morris O. Wolk
*Assistant Examiner*—Sidney Marantz
*Attorney, Agent, or Firm*—Nolte and Nolte

[57] ABSTRACT

Method for the preparation of starch hydrolysis products containing mixtures having a dextrose equivalent of 5 to 10 which mixtures have the property of forming together with water, white glossy thermoreversible gels having a neutral taste, which gels are stable to freezing and defrosting and the consistency of which gels may be varied from pasty to cutting hard depending upon the proportion of water contained in the gel, comprising mixing two starch products which in the admixture have an average dextrose equivalent of 5 to 10, the starch products being of respective degrees of polymerization differing from the other by at least ten times and each of the starch products being branched and at least one of the starch products being a starch hydrolysis product.

2 Claims, No Drawings

METHOD OF PRODUCING STARCH HYDROLYSIS PRODUCTS FOR USE AS FOOD ADDITIVES

This is a continuation-in-part of Ser. No. 551,183, filed Feb. 19, 1975, which, in turn, is a divisional application of application Ser. No. 391,711, filed Aug. 27, 1973.

This invention relates to a method for the production of starch hydrolysis products having a low dextrose equivalent (DE), which are suitable to form with water thermoreversible secondary valence gels that can be used with advantage as body- and consistency-imparting vehicles or additives, i.e., thickeners, in foodstuffs and foodstuff preparations.

The production of starch hydrolysis products having a low DE (range 5–25) is known in itself. Acid hydrolytic and enzymatic methods are used for the hydrolysis of all known starches, preferably of the waxy cereal starches. In one reaction for the production of starch hydrolyzate compositions having a low DE, a starch, which was dissolved in an aqueous medium at a temperature above its gelatinizing temperature, is liquified and hydrolyzed by bacterial α-amylase at a temperature of less than 95° C to a DE value between 5 and 25. In another reaction for the production of highly concentrated dextrin solutions for the paper industry, a potato starch suspension is first degraded so far, at a temperature which is below the gelatinization temperature, with α-amylase at 59° C. that the suspension assumes such a viscosity in the subsequent temperature increase above the gelatinization point that it can be stirred. In a second degradation stage, the hydrolysis is then continued at about 75°–80° C. until the desired end viscosity is obtained and the enzyme is inactivated by the addition of ferment poisons, oxidants or acids.

The known methods lead to starch degradation products which form with water at concentrations above about 30% by weight viscous solutions which are characterized by high stability to freezing, defrosting and heating processes, high clarity, crystallization-inhibiting action, and by the property that they do not solidify to a gel, even in very high concentrations. Because of their lack of shape stability, such starch degradation products cannot be used as thickeners for foodstuff preparations.

It is also known that undegraded cereal starches yield dimensionally stable puddings with gel-like properties after gelatinization in water at concentrations of about 8–12% by weight. The same properties as in cereal starches are also found in potato starches which have been slightly modified by suitable treatment with chemicals (so-called potato starch flour). Gel-like preparations can also be obtained from non-gelling starches, particularly waxy cereal starches, after functional groups have been introduced by a chemical derivatization process.

The main disadvantage of the above mentioned starches is that their gels produced with water are not suitable as vehicles or additives in foodstuffs and foodstuff preparations if they are subjected to the influence of temperatures below the freezing point or to prolonged storage at room- or refrigerator-temperature. These gels and starch dispersions undergo irreversible conversions on freezing, and the starch has, after defrosting, the form of a water-insoluble spongy mass. When these starch gels are stored, for example, as puddings or edible pastes, the high-molecular starch components associate, forming hydrogen bridge bonds, and the consistency changes to such an extent that the gel becomes hard and repels water. The appearance and other sensory properties are negatively influenced. None of the above mentioned changes can be reversed by heating.

Other disadvantages of native starches are that their gel-like preparations very frequently have a typical, pasty-sticky consistency and a characteristic taste. These products are not suitable for use in foodstuffs or foodstuff preparations where it is important that the foodstuffs or foodstuff preparations maintain their shape after spreading or extruding. An additional disadvantage of the above mentioned products is that after gelling no phase transformation can be achieved by heating, which renders the subsequent homogeneous incorporation of solid or dissolved ingredients, like salt, sugar, colorants, preservatives and the like, to a great extent difficult, if not impossible.

The main disadvantage of starches into which functional groups having cations capable of dissociation have been introduced by derivatization, for example, carboxymethyl starch or phosphoric esters of the starch, is that the consistency properties of their aqueous preparations depend to a great extent on the pH-Value, and that they are greatly influenced by salts.

The object of the invention is to eliminate the above indicated shortcomings of the presently known starches, starch derivatives and starch hydrolysis products to such an extent that preparations can be produced which form with water white, glossy thermoreversible gels having a neutral taste, which are stable to freezing and defrosting and the consistency of which can be varied from pasty to cutting-hard.

The starch hydrolysis products having a low dextrose equivalent (hereafter "SHP") can be obtained according to the invention by mixing starches of different degrees of degradation, which differ in their degrees of polymerization by at least one order of magnitude, that is, by at least 10 times, if necessary after the introduction of additives. As the high molecular starches for the mixtures may be used all native or suitably derivatized starches of different vegetable origin as well as the products of partially degrading the starches by any suitable method, either alone or in combination with each other. As low molecular components of the mixture can be used all substances which greatly inhibit an intermolecular association of the above mentioned high molecular substances, effected by hydrogen bridge bonds, for example, starch hydrolysis products having a dextrose equivalent of 5 to 10, prepared for instance by enzymatic degradation or acid hydrolysis.

In the production of SHP by mixing high and low molecular starch products, one of these two components can be partly or completely replaced by other substances, preferably by polysaccharides or their degradation products. As high molecular components can be used all substances which can form secondary valence gels by the formation of hydrogen bridge bonds, for example microbial polysaccharides, pectins, as well as their high molecular degradation products. As low molecular components can be used for example extensively degraded starch hydrolysis products in hydrated form.

In one embodiment of the invention, an aqueous mixture of an enzymatically degraded starch having a dextrose equivalent of 5 to 10 and native starch are heated to boiling while stirring and then the boiling is continued preferably for about 80 minutes, with reflux, a water bath being used for the heating. Upon cooling, a pasty thermoreversible gel results.

In another embodiment, enzymatically degraded starch having a dextrose equivalent of 5 to 10 is mixed with soluble starch (Zulkowski starch) and water and the mixture is heated to boiling while being stirred. The product is stored in a refrigerator at 4° C. for 24 hours, and a pasty, thermoreversible gel is formed.

In still other embodiments, aqueous mixtures of acid hydrolysis degraded starch having a dextrose equivalent of 5 to 10 and native starch or Zulkowski starch or of two acid hydrolysis or enzymatically degraded starches are boiled and cooled to form pasty, thermoreversible gels.

Enzymatically degraded starches which may be used in the mixtures according to the present invention include the SHP produced by enzymatic degradation according to the process of our U.S. application Ser. No. 391,711, filed Aug. 27, 1973.

The gel may be converted into a dry product by dehydration. The dehydration is effected preferably by spray drying. Drum or freeze drying have also proved expedient.

Into the SHP according to the invention, other substances can be introduced, even during the production of the SHP, such as nutrients and additives, foodstuffs, foodstuff preparations and enzymes. This is particularly important when small amounts of certain substances such as colorants, preservatives, emulsifiers, stabilizers and the like must be added to the SHP. Preferably, these additions are made to the SHP solutions prior to the further processing of the solution.

The SHP according to the invention have DE values below 25, preferably 5–10. Products, the DE of which are within the range of 5–10, contain components which form colored complexes with iodine. In the case of SHP produced from potato starch, these complexes have with iodine normalities of $4 \cdot 10^{-4}N$ in the wavelength range of 530 to 550 nm an absorption maximum which is displaced toward smaller wavelengths when the iodine concentration increases.

The SHP produced according to the invention with DE values of 5–10 are not hygroscopic and yield after dissolution in water, in dependence on the SHP concentration, upon cooling pasty to cutting-hard white-glossy gels, if a certain concentration, of preferably 15–40% by weight, is provided. Below about 15–18% by weight, pulpy consistencies are obtained. In order to obtain pasty, spreadable, shape-keeping masses with the common nutrient fats, a consistency similar to butter, margarine or lard, the dry substance content of aqueous SHP preparations is standardized to values between 25 and 30% by weight. If the DE value of the SHP is outside the range of 5–10, the dry substance content must be varied correspondingly to obtain products with the same consistency properties.

A considerable change in consistency occurs when these gels are heated. In the temperature range of 50°–70° C., the SHP gels melt, forming optically clear aqueous solutions (sols). On recooling, the solution solidifies again to a gel. The finished gels can be frozen and stored in this form. After defrosting, the original consistency of the gels is restored.

The SHP gels have the special properties that they can be mixed completely with the common nutrient fats, such as butter, margarine and lard, and partly with vegetable oils, and that they show no phase separation in this form, even when stored for long periods of time at room or refrigerator temperatures.

Due to the above mentioned properties, the SHP can be used in dry form or prepared with water, preferably in gel form, as vehicles or additives for foodstuffs and foodstuff preparations, if necessary by adding fats, fatty acids, medium-chain triglycerides, proteins, protein hydrolyzates, amino acids, carbohydrates, salts, acids, colorants, flavorings, vitamins, enzymes, hormones, emulsifiers, stabilizers, preservatives, ethanol and the like.

One field of application is based on the lack of hygroscopy and the good water solubility of the SHP. They can be used with advantage as drying aids and as a vehicle in the dehydration of sensitive substances, for example, in the spray drying of seasonings, instant beverages (coffee, tea, cocoa, fruit drinks), spices, flavors, enzymes as well as fruit and vegetable homogenates or concentrates.

Other applications are used of the gels or hydrolysis products as thickeners, stabilizers, body-imparting and water-binding additives for puddings, creams, soups, sauces, coffee lighteners, ice cream mixes, fruit drinks, vegetable concentrates, milk drinks, canned and prepared dishes. Advantages to be mentioned in this range of application are the freezing-defrosting reversibility of the gels, and that they are miscible with aqueous liquids in any ratio, due to their meltability. This is of advantge, for instance in the use of SHP as an essential sauce component in canned fish, meat, vegetable and fruit dishes, where the tissue water issuing during the sterilization must be absorbed by the sauce without phase separation.

Additional used for the SHP produced according to the invention result from the fact that their aqueous preparations are miscible with proteins, since concentrated protein solutions, such as the yellow and the white of an egg, can be worked into the SHP gels, or SHP dry products can be dissolved in diluted aqueous protein solutions, such as milk, and the mixtures can be made to gel.

In many of the above mentioned uses, it is of great importance that the consistency of the SHP gels is insensitive to the influence of the additions of salts and acids necessary in numerous food preparations. The SHP according to the invention are characterized by neutral taste and by their consistency and melting behavior in the mouth, which comes close to the natural nutrient fats. Similarly to the natural spreadable fats, the gels according to the invention require no further additions to produce turbidity and gloss. Due to these special properties, the gels according to the invention can be used as fat substitutes wherever the fat acts in conventional manner as a consistency former: in cake creams and fillings, garnishments, mayonnaise and remoulades, cream cheeses and other cheese preparations, bread spreads, pastes, meat and sausage products and whipped cream. The use of these gels as a substitute for nutrient fats or proteins in these products offers the technological advantage that the consistency can be adapted to the respective need on the basis of the dry substance content. There is achieved, furthermore, an improved consistency stability during storage at room, refrigerator or freezer temperatures.

Beyond these technological advantages, the considerable value of the SHP produced according to the invention consists in that they offer extensive new possibilities for the preparation of reduced fat and, thus, low calorie foods. The considerable reduction in calories is achieved since the gels contain about 75% water and their dry substance consists of an easily digestible carbohydrate whose calorie content is only about half that of fat.

The SHP produced according to the invention are not changed in the chemical structure of their basic building block, that is, of the anhydro-D-glucose- ring. Acid or enzyme hydrolysis of starch does not destroy the 1,6-glucosidic linkages present in amylopectin and these form into branched oligosaccharides and dextrins. Consequently, the SHP of the invention are branched.

Specific embodiments of the invention are described in the following examples, in which all proportions are by weight, unless otherwise indicated.

EXAMPLE 1

100 g. of SHP prepared with the use of 0.22 ml. of enzyme solution according to Example 3 of our U.S. application Ser. No. 391,711, filed Aug. 27, 1973 is stirred together with 4 g. of native potato starch and 0.1 g. of citric acid. The mixture is heated to the boiling point while being stirred. The boiling is continued for 80 minutes, with reflux, a water bath being used for the heating. Upon cooling, a pasty, thermoreversible gel is formed.

EXAMPLE 2

490 g. of the SHP enzymatically prepared in a Brabender Viscograph according to Example 5 of our U.S. application Ser. No. 391,711, filed Aug. 27, 1973, are converted by freeze drying into a dry product, and the mixtures indicated in the table below are produced with soluble starch (Zulkowski starch):

| Amount of SHP with DE = 9.2% (g.) | Amount of Zulkowski starch (g.) | Consistency characteristic | Penetration of standard body (mm.) |
|---|---|---|---|
| 30 | 0 | viscous | 20.0 |
| 27 | 3 | pasty | 14.5 |
| 26 | 4 | " | 12.9 |
| 25 | 5 | " | 10.5 |
| 24 | 6 | " | 7.8 |

The mixtures are boiled after addition of 70 g. water under stirring. After being poured into suitable measuring vessels, the samples are stored in the refrigerator for 24 hours at 4° C., and the penetration of a standard penetrometer body is measured as in Example 4 of our aforementioned application. The penetrometer values obtained are indicated in the last column of the table and are a function of the mixing ratio. The four mixtures of SHP with Zulkowski starch formed pasty, thermoreversible gels.

We claim:
1. Method for the preparation of a starch hydrolysis product-containing mixture having a dextrose equivalent of 5 to 10 which mixture has the property of forming together with water, white, glossy thermoreversible gels having a neutral taste, which gels are stable to freezing and defrosting and the consistency of which gels may be varied from pasty to cutting-hard depending upon the proportion of water contained in the gel, comprising mixing together two starch products which in the admixture have an average dextrose equivalent of 5 to 10, the starch products being of respective degrees of polymerization differing each from the other by at least ten times and each of the starch products being branched and at least one of the starch products being a starch hydrolysis product.

2. Method according to claim 1, in which the starch products of higher degree of polymerization are selected from the group consisting of native and derivatized starches of vegetable origin, microbial polysaccharides and pectins and degradation products of the foregoing and the starch products of lower degree of polymerization are starch hydrolysis products.

* * * * *